(12) United States Patent
Thomas et al.

(10) Patent No.: US 7,239,659 B2
(45) Date of Patent: Jul. 3, 2007

(54) METHOD AND APPARATUS FOR CHANNEL FEEDBACK

(75) Inventors: Timothy A. Thomas, Palatine, IL (US);
Kevin L. Baum, Rolling Meadows, IL (US); Philippe J. Sartori, Algonquin, IL (US); Frederick W. Vook, Schaumburg, IL (US); Xiangyang Zhuang, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/253,239

(22) Filed: Oct. 18, 2005

(65) Prior Publication Data

US 2006/0094435 A1 May 4, 2006

Related U.S. Application Data

(60) Provisional application No. 60/624,817, filed on Nov. 4, 2004.

(51) Int. Cl.
*H04L 27/30* (2006.01)
(52) U.S. Cl. ............ 375/141; 375/220; 375/340; 370/278; 370/282; 370/321; 370/465; 370/478; 455/67.1; 455/226.1
(58) Field of Classification Search ............ 375/140, 375/141, 146, 147, 219, 220, 260, 267, 299, 375/340; 370/203, 278, 282, 319, 320, 321, 370/330, 342, 343, 344, 441, 442, 464, 465, 370/478–480; 455/49.1, 67.1, 101, 103, 455/132, 226.1, 272
See application file for complete search history.

(56) References Cited

U.S. PATENT DOCUMENTS

| 7,065,144 | B2 * | 6/2006 | Walton et al. ............... 375/260 |
| 7,139,328 | B2 * | 11/2006 | Thomas et al. ............. 375/299 |
| 2004/0042427 | A1 * | 3/2004 | Hottinen |
| 2004/0224725 | A1 * | 11/2004 | Kim et al. |
| 2006/0039489 | A1 * | 2/2006 | Ikram et al. |
| 2006/0056531 | A1 * | 3/2006 | Li et al. |
| 2006/0068718 | A1 * | 3/2006 | Lie et al. |

OTHER PUBLICATIONS

T.L. Marzetta et al., "Fast Transfer of Channel State Information in Wireless Systems," submitted to IEEE Trans. On Comm., Jun. 2004.
Vook et al., "Signaling Methodologies to Support Closed-Loop Transmit Processing in TDD-OFDMA", IEEE C802, Jul. 13, 2004.
Jotten et al., "Efficient Representation and Feedback Signaling on Channel State Information in Frequency Division Duplexing MIMO Systems," Proc. WPMC Oct. 2002.
Love et al., "Grassmannian Beamforming for Multiple-Input Multiple-Output Wireless Systems," IEEE Trans on Info. Theory, vol. 49, No. 10, Oct. 2003.

* cited by examiner

*Primary Examiner*—Dac V. Ha (57) ABSTRACT

A method for communicating channel estimates on a plurality of subcarriers between a transmitting device and a receiving device. The transmitting device determines a channel estimates on a plurality of subcarriers and then encodes the channel estimates into at least one encoded channel waveform. Then the transmitting device transmits the at least one encoded channel waveform to the receiving device.

35 Claims, 5 Drawing Sheets

FIG. 1

Example time diagram for feedback in a TDD communication system (DL is DownLink and UL is UpLink). Receive SDMA techniques are can be used on the uplink so that multiple mobiles can send their feedback on the same time-frequency resources.

FIG. 2

Example time diagram for feedback in a FDD communication system (DL is DownLink and UL is UpLink). Receive SDMA techniques are used on the uplink so that multiple mobiles can send their feedback on the same time-frequency resources.

FIG. 4

A second option for the feedback portion of the uplink. Each rectangle corresponds to a single subcarrier at one OFDM symbol.

FIG. 3

One option for the feedback portion of the uplink. Each rectangle corresponds to a single subcarrier at one OFDM symbol.

FIG. 6

Example of orthogonal-in-frequency encoding of the frequency-domain channels. There are $M_b$ transmit antennas at the BS and a single antenna at the mobile. Each rectangle corresponds to a single subcarrier at one OFDM symbol.

FIG. 5

Example of phase-shift encoding of the frequency-domain channels which results in the channels for each transmit antenna being orthogonal (separable) in the time domain. There are $M_b$ transmit antennas at the BS and a single antenna at the mobile.

Example of orthogonal-in-frequency encoding of the time-domain channels. There are $M_b$ transmit antennas at the BS and a single antenna at the mobile. Each rectangle corresponds to a single subcarrier at one OFDM symbol.

METHOD AND APPARATUS FOR CHANNEL FEEDBACK

RELATED APPLICATIONS

The present invention is related to provisional U.S. filing 60/624817, entitled "METHOD AND APPARATUS FOR CHANNEL FEEDBACK", filed 04 Nov. 2004, priority to which is claimed.

FIELD OF THE INVENTION

The present invention relates generally to communication systems, and in particular, to a method and apparatus for providing channel information to the transmitter in Multiple Input Multiple Output (MIMO) transmission.

BACKGROUND OF THE INVENTION

Multiple Input Multiple Output (MIMO) is a transmission method involving multiple transmit antennas and multiple receive antennas which promises to greatly increase the link capacity of wireless communication systems. Various transmission strategies require the transmit array to have some level of knowledge concerning the channel response between each transmit antenna element and each receive antenna element, and are often referred to as "closed-loop" MIMO. Obtaining full broadband channel knowledge at the transmitter is possible using techniques such as uplink sounding in Time Division Duplexing (TDD) if array calibration is performed at the transmitter. However the uplink sounding method does not work in Frequency Division Duplexing (FDD) systems, when a relay is used in a TDD system, or when array calibration is not performed at the transmitter. Thus there is a need for method of efficiently providing full channel knowledge at the transmitter when uplink sounding is not effective for that purpose.

DETAILED DESCRIPTION OF THE DRAWINGS

For simplicity, the invention is presented from the point of view of providing a Base Station (BS) with the channel information when performing closed-loop transmission to a Subscriber Station (SS). It should be clear that the invention also applies to scenarios where the roles of a BS and SS are reversed from the roles described herein. For example, the invention can be applied to the scenario where the SS is to be provided with the channel information to enable closed-loop transmission from an SS to a BS. Therefore, although the description will focus mainly on the case of the BS transmitting to a SS, the term "source communication unit" will refer to a communication unit (e.g., a BS, SS or other transceiver) that can perform closed loop transmission to a "target communication unit".

Also, some terms are used interchangeably in the specification: The terms, channel response, frequency selective channel profile, space-frequency channel response, are all referring to the channel response information needed by the base station in order to utilize closed-loop transmission techniques. This channel response information can also be referred to as knowledge of a channel. The terms waveform and signal are also used interchangeably. A Subscriber device or Subscriber Station (SS) is sometimes referred to as a Mobile Station (MS) or simply a mobile, and the invention applies equally to cases where the subscriber device is fixed or mobile (i.e., not fixed). A receiving device can be either a Base Station (BS), Subscriber Station (SS) or any combination thereof. Also, a transmitting device can be either a BS, SS, MS, or any combination thereof. Additionally, if the system has repeaters, relays or other similar devices, the receiving device or the transmitting device can be a repeater, relay, or other similar device. The repeater or relay can be considered equivalent to an SS if the BS is performing closed-loop transmission to the repeater/relay. The repeater or relay can be considered equivalent to a BS if the relay is performing closed-loop transmission to the SS. The relay can also be a unidirectional relay, such as an uplink relay or a downlink relay. For example, an uplink relay receives an uplink signal from an SS, and relays the signal or the information represented by the signal to the BS. The term Fast Fourier Transform (FFT) and Inverse Fast Fourier Transform (IFFT) refer to discrete Fourier transform (or similar transform) and inverse discrete Fourier transform (or similar transform) respectively.

Obtaining channel knowledge at the transmitter or source communication unit is critical for obtaining the gains promised by such transmit array techniques as maximal ratio transmission, transmit Spatial Division Multiple Access (SDMA), and closed-loop Multiple-Input Multiple-Output (MIMO) techniques. The two methods for obtaining the channel knowledge are feedback and channel sounding. Channel sounding works only for Time Division Duplex (TDD) systems and uses the fact that the uplink and downlink RF channels are reciprocal so that the BS can obtain the downlink channel knowledge from uplink channel sounding by the mobile. It is known that for channel sounding to work the BS must calibrate its uplink and downlink arrays. Unlike channel sounding, channel feedback will work for Frequency Division Duplex (FDD) systems and for TDD systems without array calibration.

This invention is a method for efficiently feeding back multiple channels (e.g., a plurality of channel estimates for a plurality of subcarriers, such as for one or more antennas in an OFDM system) from the mobile(s) to the BS (the method will also work if the BS and mobile roles are exchanged). The method works by the BS sending training (e.g., pilot symbols) from each of its transmit antennas so that mobiles can measure (or estimate) the complex channel response to each of the BS antennas (the channel estimates could also be obtained from other methods that do not require training data, such as decision-directed channel estimation or blind channel estimation). Next each mobile that is scheduled by the BS to do so (or knows/desires to do so by some other means) encodes the channel estimates to each BS antenna (constructs a channel waveform) and then potentially multiple such mobiles simultaneously transmit the encoded channel estimates back to the BS to aide BS in determining the downlink channel estimates.

The channel encoding process of the present invention at a particular mobile does not require quantization of the channels beyond what is already done by the inherent precision of the mobile's receiver (e.g., conventional feedback transmissions convey binary information on a symbol using conventional constellations such as QPSK, while the present invention can convey substantially un-quantized channel estimates (e.g., the values need not be limited to the four values of a QPSK constellation, but are of course limited by the inherent precision of the receive and transmit processing of the mobile)); rather it efficiently (in a bandwidth sense) combines some number of measured channels (e.g., the channels from each BS antenna to one or more of the mobile's antennas) into a single channel waveform, which may also be referred to as an encoded channel waveform, for transmission to the BS. Multiple mobiles may transmit their encoded channel waveforms on the same time-frequency resource in an SDMA fashion. The BS then uses its multiple receive antennas to separate the encoded channel waveforms from each mobile and then determines the channel estimates by undoing the encoding. Note that for multiple antenna mobiles each antenna at the mobile could transmit a different encoded channel waveform in a MIMO fashion (e.g., the waveform is an encoding of the channels from all BS antennas to the mobile antenna where the encoded channel waveform is transmitted from). Of course the MIMO-type transmission of an encoded channel waveform from one mobile could be overlap in an SDMA fashion with a transmission of an encoded channel waveform from another mobile. By efficiently encoding the channel estimates and using SDMA and/or MIMO on the uplink transmission, the channel feedback can be made very bandwidth efficient. The invention efficiently feeds back broadband channels in the frequency domain (e.g., on multiple subcarriers of an OFDM system) or time domain (e.g., by replacing time-domain data symbols with samples of the channel waveform) by a selective combination of SDMA, MIMO, multiple source channel estimation, scrambling to avoid excessive peak to average power ratios, and pilot design.

Figure 1:
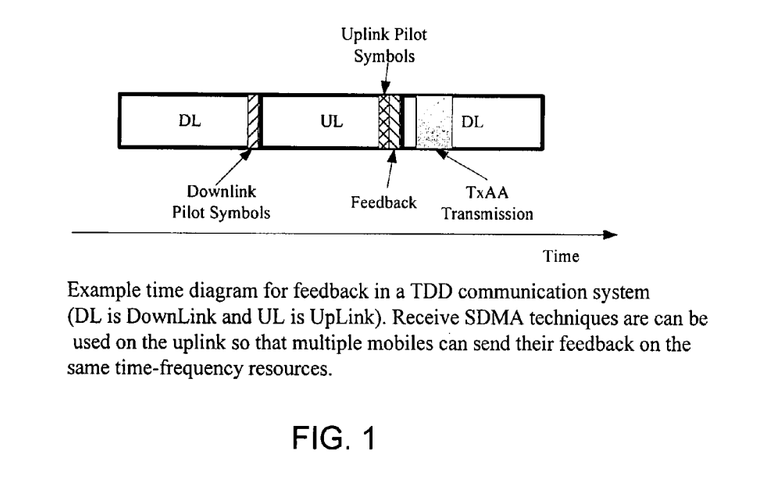
FIG. 1 is a time diagram for feedback in a TDD system.

FIG. 1 shows an example time diagram for feedback in a TDD communication system where the base station is requesting channel information to do some type of closed-loop Transmit Adaptive Array (TxAA) transmission, in accordance with the present invention. First, the BS sends training data (e.g., pilot symbols) near the end of a downlink (in actuality the training can be any where in the downlink frame but the feedback latency is reduced if the training is sent at the end of the downlink frame). For a BS with multiple transmit antennas, the BS may perform multiple transmissions, such as first transmission on a first transmit antenna and a second transmission on a second transmit antenna and so forth (multiple transmissions), where the multiple transmissions preferably include pilot symbols that allow a SS to estimate the channel on a plurality of subcarriers to each of the transmitting BS antennas. The multiple transmissions may be simultaneous, preferably with orthogonal/separable pilot sequences among the antennas (e.g., with different antennas using different sets or pluralities of subcarriers), or may be separate but preferably close together in time. Then each mobile which was requested by the BS to send channel information, estimates the channels to each BS transmit antenna (e.g., by determining a plurality of channel estimates for a plurality of subcarriers), encodes the channel estimates into an encoded channel waveform (produces or constructs a channel waveform), and then communicates knowledge of the channel by sending (transmitting) the encoded channel waveform to the base during the uplink. In one embodiment, the channel estimates are encoded to allow channel estimates from multiple BS antennas and/or multiple SS receive antennas to be sent in one symbol time. Note that in one embodiment the channel estimates are sent along with pilot symbols which are used to estimate the uplink channel at the BS (the uplink channel estimates are used by the BS to allow its receive array to separate multiple mobiles' uplink channel feedback and also detect the encoded channel estimates from each mobile). The pilot symbols may form a channel sounding waveform (e.g., pilot symbols on a set of OFDM subcarriers) for the purpose of enabling uplink channel estimation at the BS. The BS uses the fed-back channel knowledge to perform closed-loop transmission (e.g., TxAA) on the downlink following the uplink (the closed loop transmission is preferably on the very next downlink interval so as to minimize the channel variation between the measurement and the use of the measurement, but the invention is also applicable to situations where the delay is larger). Since the fed back channel knowledge does not need to be quantized to a conventional symbol constellation (e.g., QPSK), the resolution and dynamic range of the channel knowledge can improved (e.g., substantially un-quantized) as compared to conventional schemes. Therefore, in one embodiment, channel estimates being fed back are substantially un-quantized. In other embodiments, a channel estimate can be mapped to one of a predetermined set of values (e.g., the nearest of a predetermined set of complex values), or can be clipped, or can be set to zero if its magnitude is below a particular value, etc.

Figure 2:
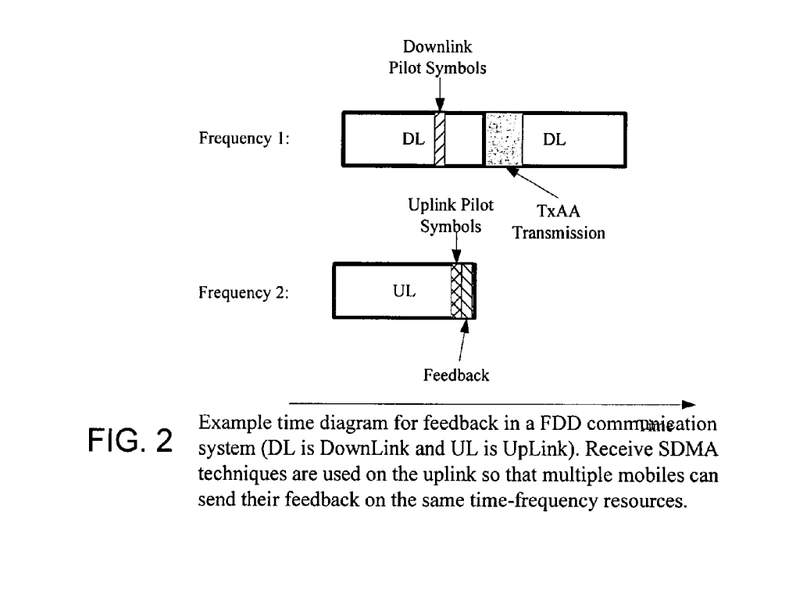
FIG. 2 is a time diagram for feedback in a FDD system.

FIG. 2 shows an example time-diagram for feedback in a FDD communication system where again the BS is requesting channel information to do closed-loop (e.g., TxAA) transmission. The operation is similar to TDD mode, but in FDD the latency between measuring the channels and the BS using the channel estimates on the downlink can be made much lower than TDD because of the simultaneous transmission of both the downlink and the uplink. For simplicity, the feedback mechanism assumes that the downlink and uplink of an FDD system use the same modulation method (e.g., OFDM) with the same bandwidth. How ever, the proposed feedback mechanism easily extends to the case where the uplink and downlink have different modulation methods and/or bandwidths. In addition, the invention contemplates the use of multiple transmission modes in the uplink—for example, IFDMA, CDMA, single carrier TDMA, or hybrids of these for regular uplink data transmissions (any of these providing a low peak to average ratio) and OFDM/OFDMA for the feedback transmissions (providing the frequency domain feedback of the complex channel response). In this case, the feedback transmissions are preferably multiplexed in time or frequency with the regular data transmissions. Therefore, present invention can transmit the channel waveform using a different modulation method than is used for other data transmissions from the target communication unit.

Note that the feedback portion of the uplink frame shown in FIG. 1 and FIG. 2 consists of two OFDM symbol time periods. The first symbol period is for each mobile to send pilot symbols (e.g., a channel sounding waveform) that are used for estimating the channel and the second symbol period is used to send the channel feedback to aide a source communication unit in determining channel estimates for a plurality of subcarriers.

Figure 3:
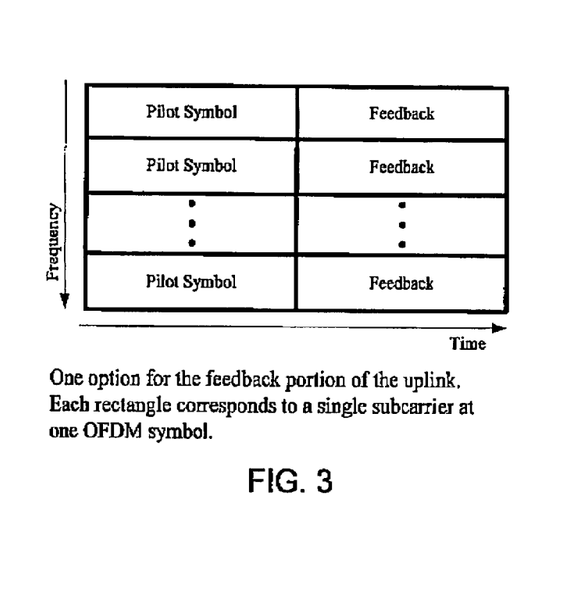
FIG. 3 shows one option for efficiently feeding back channel knowledge.
Figure 4:
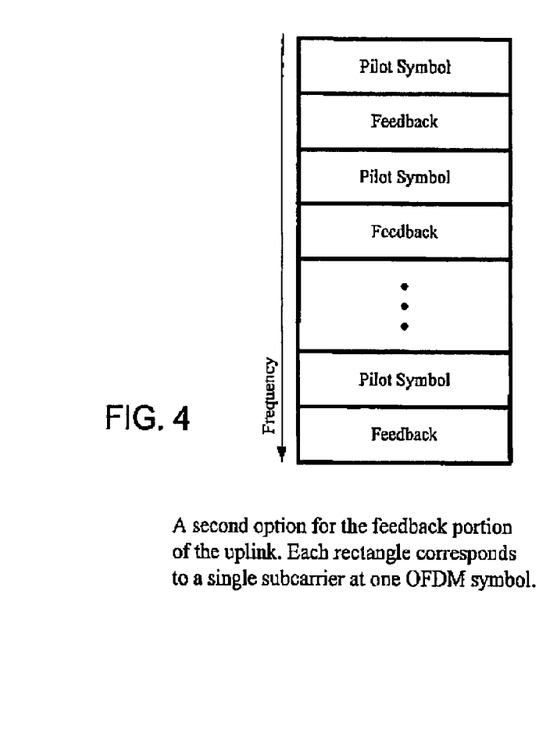
FIG. 4 shows a second option for efficiently feeding back channel knowledge.

This option for feedback is shown in FIG. 3 Another option for feedback, as shown in FIG. 4, requires only one OFDM symbol by mixing the pilot symbols (e.g., channel sounding waveform) with the feedback. The mixing shown in FIG. 4 comprises frequency multiplexing, but other types of mixing, such as code multiplexing, can also be used. Obviously an arbitrary mix of pilots and the channel waveform is possible such as scattering the pilot symbols and the samples of the channel waveform over multiple symbol times. In addition, pilot symbols may not be explicitly sent with the channel waveform, for example, when the source communication unit uses channel estimates from normal data traffic to detect the channel waveform transmitted from the target communication unit.

Relative to a channel reuse (or reciprocity) strategy (i.e., in TDD, the mobile sounds the uplink and the BS assumes channel reciprocity between the uplink and downlink channels) and other prior art techniques, the advantages of the proposed feedback method are:

1. The proposed feedback method can be used in both TDD and FDD modes.

2. The proposed method is much lower complexity at the mobile unit than methods based on codebooks and vector quantization.

3. Using the proposed feedback method in TDD mode would require no antenna calibration at the BS or mobile.

4. The proposed feedback method would provide a channel feedback mechanism in TDD systems with relays on the uplink (uplink channel sounding will not work because the mobile is not transmitting directly to the BS).

5. The proposed feedback method could be very useful during array calibration.

For example, the proposed feedback method can be used to send the inverse of the channel from an SS to the BS.

6. The proposed feedback method will work even when the BS's uplink and downlink antenna arrays are different.

7. The mobile can use broadcast pilots on the downlink to determine the composite channel (i.e., the effective channel seen by the mobile which is a combination of the transmit weights and the true RF channel) if the mobile knows how the BS computes its transmit weights. This is because the mobile knows the channel which the BS uses to compute the transmit weights which is not true for uplink channel sounding.

A more detailed description of some aspects of the proposed feedback method is now given. Let there be $M_b$ antennas at the BS (both on the downlink and the uplink) and two cases will be explored for the mobiles: 1) where mobile u only has a single transmit antenna and $M_{m,u}$ receive antennas and 2) where mobile u has $M_{m,u}$ transmit and receive antennas. (Note that the feedback method is applicable to any number of transmit antennas at the mobile. Also the feedback method easily extends to the case where the base has a different number of receive antennas than transmit antennas.) Assuming an OFDM downlink with K usable subcarriers, the received signal for mobile u on its receive antenna m for subcarrier k ($0 \leq k \leq K-1$) and symbol time b is given as:

$$Y_{u,m}(k, b) = \sum_{l=1}^{M_b} H_{u,m,l}(k, b) X_l(k, b) + N_{u,m}(k, b) \quad (1)$$

where $H_{u,m,l}(k,b)$ is the frequency-domain channel from BS (e.g., source communication unit) antenna l to mobile (e.g., target communication unit) u's $m^{th}$ receive antenna on subcarrier k and symbol time b, $X_l(k,b)$ is the training symbol transmitted from the BS's $l^{th}$ antenna, and $N_{u,m}(k,b)$ is additive noise with power $\sigma_u^2$. Note that time index b is used to indicate the symbol time of the pilot symbols (there could be multiple b values if more than a single OFDM symbol is needed for channel estimation purposes).

The mobiles can run a multi-source channel estimator on the received signal to determine channel estimates at time b, $\hat{H}_{u,m,l}(k, b)$, preferably for two or more values of k (determining a plurality of channel estimates for a plurality of subcarriers). Note that the channel estimates are typically complex values (representing both amplitude and phase). The BS may transmit orthogonal pilot signals from its multiple antennas to enable simple multi-antenna channel estimation at the mobile. Other channel estimation methods may also be used (e.g., decision aided, iterative, etc. The mobiles then encode the channel information to produce a channel waveform based on one of the following methods.

Method 1: Separable-in-Time Feedback of the Frequency-Domain Channel

Figure 5:
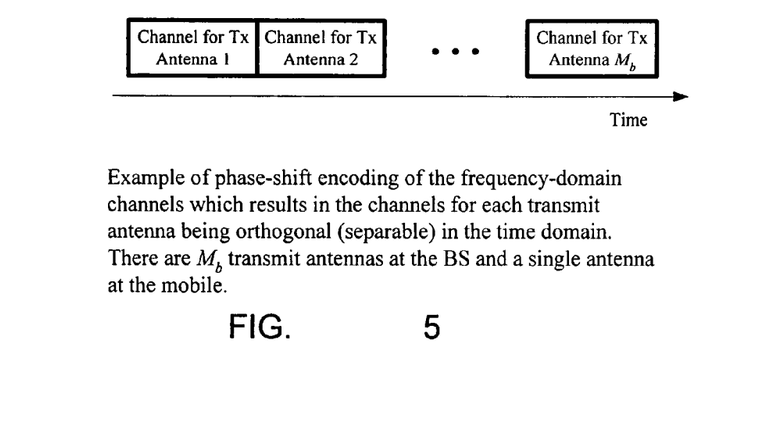
FIG. 5 is an example of using a phase-shift to efficiently encode the channel information.

This feedback method uses a linear phase shift/ramp (a.k.a. Steiner's phase shift) for encoding the measured channels (channel estimates) from multiple transmit antennas so that the time-domain channels are orthogonal (i.e., the channel estimates are separable in the time domain). An example of the resulting time-domain representation of the phase-shift encoding of the frequency-domain channels is given in FIG. 5 for $M_b$ transmit antennas at the base for a single antenna mobile. As can be seen, the proper phase shift causes the time-domain channels for each base transmit antenna to occupy a different portion of the time domain. For this feedback method the mobiles encode the channel estimates from each BS antenna for efficient transmission by creating the following uplink waveform (i.e., the encoded channel waveform or channel waveform) for mobile u with a single transmit antenna (note that the time index d is used to indicate the time position of the uplink feedback, which happens at some time after the time index b where the pilot symbols are transmitted from the BS to allow the channel estimation at the SS):

$$Z_u(k, d) = \beta_u \sum_{l=1}^{M_b} \sum_{m=1}^{M_{m,u}} \hat{H}_{u,m,l}(k, b) S_{u,m,l}(k, d) \quad (2)$$

where $S_{u,m,l}(k,d)$ is an encoding sequence for user u's channel estimates and $\beta_u$ is a scaling (scale factor) to make the average transmit power (averaged across all frequency and if applicable, time) of $Z_u(k,d)$ be one (or some other desired power level). It is important to have one single scaling for all channel estimates for a single mobile so that the relative power levels between each channel estimate is preserved. If the scaling is not needed it can be eliminated by setting $\beta_u=1$. Note that if $M_b$ is two or more, then the BS has a plurality of antennas, and determining a plurality of channel estimates for a plurality of subcarriers may comprise determining a plurality of channel estimates for each of a plurality of subcarriers based on a plurality of transmissions (e.g., each from a different antenna) received from the source communication unit.

One example of an encoding sequence is the following signal that incorporates two aspects. The first is the Steiner's phase shift which enables the separation of the channels in the time domain, and the second is a scrambling sequence:

$$S_{u,m,l}(k,d) = q_u(k,d)\exp\{-j2\pi k(m-1+(l-1)M_{m,u})/\alpha_u\} \quad (3)$$

where $q_u(k,d)$ is any known/scrambling sequence (e.g., a constant modulus random sequence such as random BPSK symbols) and $\alpha_u$ is the shift factor for user u (e.g., $\alpha_u = M_{m,u} M_b$). Note that the use of a scrambling sequence is an important aspect of the invention, because multiplying the channel estimates by the scrambling sequence prevents excessively large peak to average power ratios(PAPR) in the transmitted uplink signal (i.e., the IFFT of $Z_u(k,d)$), especially for certain channel conditions (e.g., flat fading channels).

When mobile u has multiple transmit antennas, a MIMO-like feedback transmission is possible and the encoded channel waveform is given as (for the $m^{th}$ transmit antenna at mobile u):

$$Z_{u,m}(k,d) = \beta_u \sum_{l=1}^{M_b} \hat{H}_{u,m,l}(k,b) S_{u,m,l}(k,d) \quad (4)$$

where $\beta_u$ is a scaling to make the average transmit power (averaged across all frequency, all mobile antennas, and if applicable, time) of $Z_{u,m}(k,d)$ be one (or some other arbitrary power level). The encoding sequence, $S_{u,m,l}(k,d)$, is given as:

$$S_{u,m,l}(k,d) = q_{u,m}(k,d)\exp\{-j2\pi k(l-1)/\alpha_u\} \quad (5)$$

where $q_{u,m}(k,d)$ is any known/scrambling sequence (e.g., a constant modulus random sequence such as random BPSK symbols) and $\alpha_u$ is the shift factor for user u (e.g., $\alpha_u = M_b$).

Note that when using (2) or (4) the frequency-domain channel on subcarrier k is fed back on the subcarrier k. In a TDD system this means that if subcarrier k is in a fade then the fed-back channel will be sent on a low-amplitude subcarrier. To avoid this problem, an additional aspect of the invention involves interleaving or permuting the order of $Z_u(k,d)$ or $Z_{u,m}(k,d)$ across frequency to effectively scramble the feedback across frequency. Note that the interleaving has to be performed on the encoded channel waveform, $Z_u(k,d)$ or $Z_{u,m}(k,d)$, and not on the channel estimates before the phase shift is applied. If multiple OFDM symbols are used to send the feedback on the uplink then interleaving across time in addition to frequency may be advantageous especially when the different channels have different average powers (e.g., for two channel estimates, each having K values to be sent back, to be transmitted over two OFDM symbols, half of each channel estimate (K/2 values from each estimate) should be transmitted on each OFDM symbol so that the total transmit power is the same for each OFDM symbol).

Also note that (2) and (4) can be altered to accommodate the case where pilots are mixed with the feedback as shown in FIG. 4. Those equations can also be altered to encode channels when the downlink bandwidth and/or modulation method (e.g., single carrier) is different than the uplink.

Method 2: Orthogonal-in-Frequency Feedback of the Frequency-Domain Channel

Figure 6:
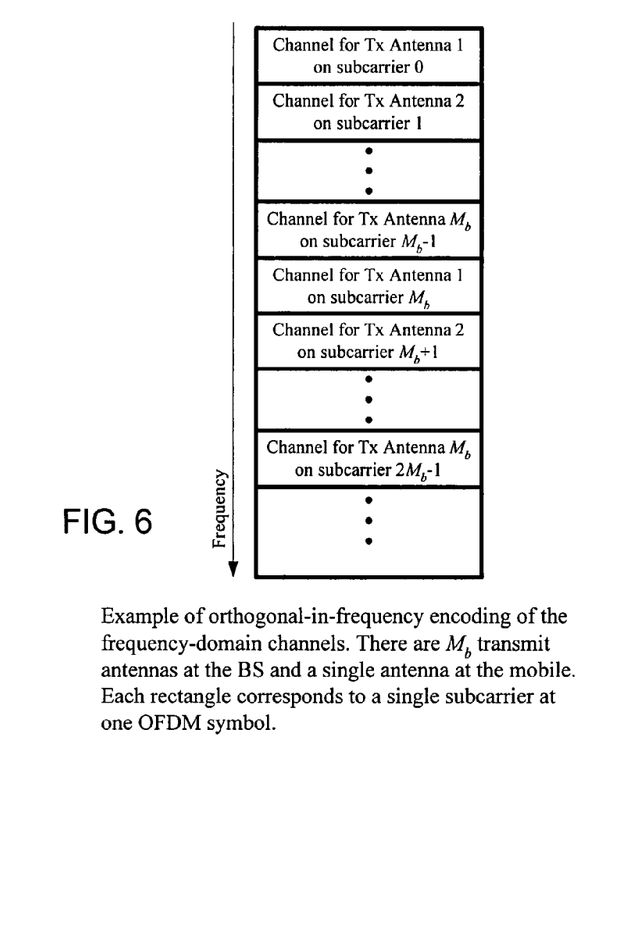
FIG. 6 is an example of the orthogonal-in-frequency encoding of the frequency-domain channel information.

In this method, the measured downlink channels are separated in the frequency-domain so they do not interfere with each other. An example of this encoding method is shown in FIG. 6 for $M_b$ transmit antennas at the BS and a single receive antenna at the mobile. As can be seen, the frequency-domain channels for each antenna are sent on different subcarriers (e.g., mapping or encoding channel estimates for a particular antenna to a predetermined set of subcarriers) and thus do not interfere with each other. To recover the channel estimates at all subcarriers the BS needs to interpolate the channel estimates. FIG. 6 can be modified to accommodate the case where pilots are mixed with the feedback (e.g., similar to FIG. 4). In equation form, the encoded channel waveform for this form of encoding the frequency-domain channels is given as (when mobile u has only one transmit antenna):

$$Z_u(k,d) = \quad (6)$$
$$\beta_u \sum_{l=1}^{M_b} \sum_{m=1}^{M_{m,u}} \hat{H}_{u,m,l}(k,b) q_u(k,d) \delta((k+1-(l-1)M_{m,u}-m)_{M_{m,u}M_b})$$

where $(n)_N$ means n modulus N, $\delta(n)$ is one if n equals zero and is zero otherwise, $q_u(k,d)$ is any known/scrambling sequence (e.g., a constant modulus random sequence such as random BPSK symbols), and $\beta_u$ is a scaling to make the average transmit power (averaged across all frequency, and if applicable, time) of $Z_u(k,d)$ be one (or some other desired power level). As in the time-separability case, $q_u(k,d)$ helps prevent large peak to average power ratios in the transmitted uplink signal. Also as in the time-separability case, interleaving can be used to scramble the encoded signal over frequency, $Z_u(k,d)$, before transmission. When mobile u has $M_{m,u}$ transmit antennas, the encoded channel waveform for mobile transmit antenna m is given as:

$$Z_{u,m}(k,d) = \beta_u \sum_{l=1}^{M_b} \hat{H}_{u,m,l}(k,b) q_{u,m}(k,d) \delta((k+1-l)_{M_b}) \quad (7)$$

where $q_{u,m}(k,d)$ is any known/scrambling sequence (e.g., a constant modulus random sequence such as random BPSK symbols) and $\beta_u$ is a scaling to make the average transmit power (averaged across all frequency, all mobile antennas, and if applicable, time) of $Z_{u,m}(k,d)$ be one (or some arbitrary power level).

Note that equations 6 and 7 can be written without the explicit time index for simplicity, namely $$Z_u(k) =$$
$$\beta_u \sum_{l=1}^{M_b} \sum_{m=1}^{M_{m,u}} \hat{H}_{u,m,l}(k) q_u(k) \delta((k+1-(l-1)M_{m,u}-m)_{M_{m,u}M_b})$$

And $$Z_{u,m}(k) = \beta_u \sum_{l=1}^{M_b} \hat{H}_{u,m,l}(k) q_{u,m}(k) \delta((k+1-l)_{M_b})$$

Note that if $M_b$ is 2 or more, determining a plurality of channel estimates for the plurality of subcarriers may comprise determining channel estimates for a first plurality of subcarriers corresponding to a first transmission of the source communication unit (e.g., from a first antenna) and determining channel estimates for a second plurality of subcarriers corresponding to a second transmission of the source communication unit (e.g., from a second antenna).

Method 2 can also be referred to as a decimated subcarrier type of separability since the effect of the delta function is to place zeros on certain subcarriers, such that channel estimates are sent back for a decimated set of subcarriers. Another set of channel estimates (such as for a different value of l, or for a different mobile) can be assigned the subcarriers that are set to zero (as seen in FIG. 6). Method 1 can also be referred to as using a cyclic shift type separability, since the phase ramp in Eq. 5 based on $\alpha_u$ introduces a cyclic shift in the time domain representation of the channel (as seen in FIG. 5).

It can be seen from the mathematical representations of methods 1 and 2 that both method 1 and method 2 produce a channel waveform based on a plurality of channel estimates. Since the channel waveforms include a plurality of channel estimates in their construction, the channel waveforms can be considered to comprise a combination of a plurality of channel estimates. Also, $q_{u,m}(k,d)$ and $S_{u,m,l}(k,d)$ are known sequences, the channel waveforms can be seen as comprising channel estimates modulated by a known sequence. For example, $q_{u,m}(k,d)$ is preferably a binary (e.g., BPSK) sequence, but can be any known sequence.

After the channel waveform has been produced, it can be transmitted in order to communicate knowledge of the channel or aide a source communication unit in determining channel estimates for a plurality of subcarriers.

Method 3: Orthogonal-in-Frequency Feedback of the Time-Domain Channel

Figure 7:
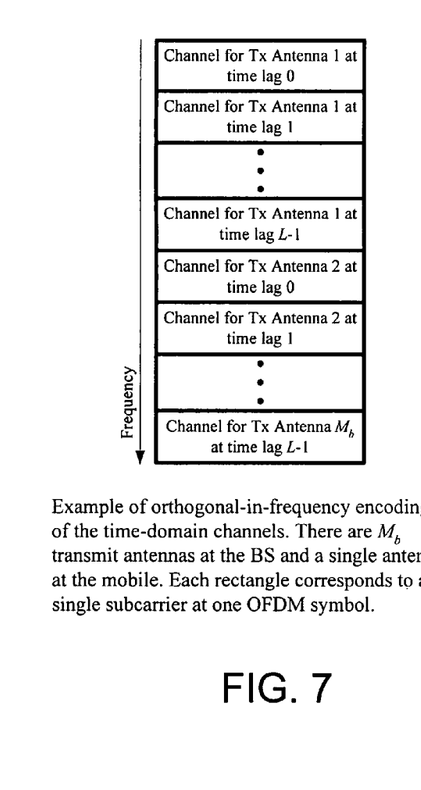
FIG. 7 is an example of the orthogonal-in-frequency encoding of the time-domain channel information.

An additional method for feedback is to send an estimated time-domain channel back in the frequency domain or in the time domain. Essentially this method works similar to the method in the previous section for sending the decimated frequency-domain channel except that the frequency-domain channel estimates are replaced by time-domain channel estimates or responses. Hence FIG. 6 is still valid, but the channel in the figure now stands for the time-domain channel. Another option is shown in FIG. 7 where each time-domain channel response for one transmit antenna and mobile antenna is sent on a continuous block of subcarriers. In equation form, the continuous-block version of feedback is expressed as (when mobile u has a single transmit antenna):

$$Z_u(n+(m-1)L+(l-1)LM_{m,u},\ d)=\beta_u \hat{h}_{u,m,l}(n,b)q_u(k,d)$$

for $0 \leq n \leq L-1$, $1 \leq l \leq M_b$, $1 \leq m \leq M_{m,u}$ (8)

where L is the assumed length of the time-domain channel, $q_u(k,d)$ is any sequence (e.g., a constant modulus random sequence such as random BPSK symbols), and $\beta_u$ is a scaling to make the average transmit power (averaged across all frequency and if applicable, time) of $Z_u(k,d)$ be one (or some other desired value). When mobile u has multiple transmit antennas, the encoded waveform for mobile transmit antenna m is given as:

$$Z_{u,m}(n+(l-1)L,\ d)=\beta_u \hat{h}_{u,m,l}(n,b)q_{u,m}(k,d)$$

for $0 \leq n \leq L-1$ and $1 \leq l \leq M_b$ (9)

where $q_{u,m}(k,d)$ is any sequence (e.g., a constant modulus random sequence such as random BPSK symbols) and $\beta_u$ is a scaling to make the average transmit power (averaged across all frequency, all mobile antennas, and if applicable, time) of $Z_{u,m}(k,d)$ be one (or some other arbitrary value).

Note that all of the described encoding schemes do not necessarily limit the dynamic range of the channel being encoded. By nature, the channels are expected to have a limited dynamic range, but in some implementations mobiles will need the encoded channels to be within a narrower dynamic range suited for its transmitter design and implementation. Thus the encoded channel waveform may be further processed so that the resulting signal fits within the dynamic range requirements of the mobile's transmitter. Various techniques are possible to ensure that the encoded channel waveform fits within the dynamic range such as (but not limited to): clipping the encoded channel waveform above some magnitude or voltage, mapping the encoded channel waveform to a certain symbol constellation, and zeroing the encoded waveform at samples where the amplitude is below a threshold. Also, these processing methods may be applied directly to the channel estimates prior to generating the composite feedback (channel) waveform (e.g., if $\hat{H}_{u,m,l}(k,b)$ is below a threshold, it may be zeroed, or if its magnitude is above a threshold, it may be clipped, or its amplitude and/or phase may need to be quantized). Another method that can be used to either control the dynamic range or possibly improve performance in noisy conditions is to perform companding on the $\hat{H}_{u,m,l}(k,b)$ values. The companding operation can optionally be reversed at the BS receiver to restore some of the dynamic range.

For simplicity of explanation, some aspects of the invention were described earlier from the perspective of providing channel knowledge for all K subcarriers of an OFDM system, or for a decimated subset of the K subcarriers of an OFDM system. This situation can occur, since the pilot symbols from the BS typically allow the estimation of all subcarriers at the MS. But even so, the MS may be requested to feed back the channel knowledge of only a subset of subcarriers (e.g., selected subcarriers, or selected subcarriers within a particular subcarrier range). In this case, the subcarriers used by the MS to sound the uplink channel and to transmit the encoded channel waveform do not need to match the subcarriers of which the channel knowledge is requested by the BS, as long as it is clear to the BS which subcarriers the feedback corresponds to. In one example when the channel knowledge of a contiguous block of subcarriers (i.e., sub-band) is fed back, all the three above-mentioned methods for producing the encoded channel waveform may apply. But in this example the third method (i.e., Orthogonal-in-Frequency Feedback of the Time-Domain Channel) preferably models the sub-band frequency response with a time-domain channel that has a larger channel tap spacing than for a full bandwidth case. In another example, when the channel knowledge for a set of disjoint subcarriers is fed back, the MS may feed back the channel corresponding to each BS antenna one at a time on a per-subcarrier basis, or simultaneously as in the MIMO-like transmission.

There may also be certain environments where the encoded channel waveform is received in low SNR or C/I environments. To improve the quality of the feedback, the transmission by the mobile of a repetition of the encoded channel waveform (in time and/or frequency) can be performed to improve the quality of the feedback. Alternatively, instead of repeating the whole encoded channel waveform, the channel estimates can be repeated before producing the encoded channel waveform. For example, in the orthogonal-in-frequency method (FIG. 6), at the subcarrier where the "channel for antenna-1 on subcarrier-$M_b$" is supposed to be fed back, the "channel for antenna 1 on subcarrier-0" can be sent again. The tradeoff for increased quality on subcarrier-0 is the increased decimation factor in the frequency domain since the channel on subcarrier-$M_b$ will not be transmitted. In addition to these techniques for improving the feedback quality, the impact of noise on the feedback channel may be reduced by applying an inverse-compander (or expander) to the $\hat{H}_{u,m,l}(k,b)$ values at the SS (preferably with a limit on the output magnitude) and by reversing the operation at the BS after the feedback is received. The input-output characteristic of the expander can be designed to improve some SNR or other quality metric at the output of the inverse operation at the BS (e.g., SNR or MSE averaged over frequency, beamforming gain based on the processed feedback, etc.).

Note that in alternate embodiments of the invention, other signals can be sent instead of the channel estimate $\hat{H}_{u,m,l}(k,b)$ for any of the feedback methods described earlier. Note that method 1 and 3 may require that the signal to be fed back in the frequency domain has an equivalent time-domain representation with finite time span. For example the reciprocals (inverses) of the channels could be sent in order to aid such array techniques such as array calibration. Another example is to transmit a frequency-selective SNR level on each subcarrier for use in power-loading techniques at the BS.

Reception and Decoding of the Feedback When All Mobiles Have a Single Transmit Antenna The BS receives a signal comprising a channel waveform (Z), the channel waveform having a plurality of channel estimates as described earlier, wherein the plurality of channel estimates comprise at least one channel estimate for each of a plurality of subcarriers. Note that the plurality of subcarriers does not need to be every subcarrier in the OFDM system—it can be a subset of the subcarriers such as for example a set of adjacent subcarriers or a set of non-adjacent subcarriers (e.g., decimated subcarriers), and the set of subcarriers can span any portion of the channel bandwidth. The BS estimates a receive channel for the received signal, preferably based on pilot signal that are received along with the channel waveform, and recovers estimates of the plurality of channel estimates based on the received signal and the estimated receive channel. A more detailed example of some aspects of this for the case where $N_u$ channel waveforms are received by the BS is given below.

$N_u$ mobiles transmit their encoded sequences at the same time and the $M_b \times 1$ received signal vector representing the received channel waveforms at the BS is given as:

$$R(k,d) = \sum_{u=1}^{N_u} G_u(k,d) Z_u(k,d) + N(k,d) \tag{10}$$

where $G_u(k,d)$ is the $M_b \times 1$ uplink (receive) channel vector on subcarrier k and time d for mobile u and $N(k,d)$ is additive Gaussian noise with correlation matrix given by $\sigma_n^2 I_{M_b}$ ($I_n$ is an n×n identity matrix).

To recover estimates of each mobile's uplink waveforms, $\hat{Z}_u(k,d)$, the BS may utilize the following MMSE combining weight for mobile u:

$$w_u(k,d) = \left( \sum_{l=1}^{N_u} \hat{G}_l(k,d) \hat{G}_l^H(k,d) + \sigma_n^2 I_{M_b} \right)^{-1} \hat{G}_u(k,d) \tag{11}$$

where $\hat{G}_u(k,d)$ is the uplink (receive) channel estimate obtained from processing pilot symbols sent from each mobile (and received by the BS) to estimate the receive channel. Note that the channel estimates $\hat{G}_u(k,d)$ are generally complex, and can be called estimated complex channel gains.

The estimate of mobile u's uplink waveform is given as:

$$\hat{Z}_u(k,d) = w_u^H(k,d) R(k,d) \tag{12}$$

Using this estimate along with the encoding strategy for mobile u (i.e., whether frequency-domain or time-domain channel estimates are sent and whether separable-in-time or orthogonal-in-frequency encoding is used, which will be known by the BS if the BS indicates to the MS, in a message, which particular method to use for providing feedback), the BS can obtain (recover) estimates of the channels that were measured at each mobile and used to produce the channel waveform transmitted by the mobile. Note that standard channel estimation procedures can be used in this step to help obtain a gain over noise plus interference from encoding the channels for multiple BS antennas together. Now the BS has downlink channel estimates to use for TxAA operations at time t (for a total feedback latency of t-b OFDM symbols).

Example for Reception and Decoding of the Feedback When All Mobiles Have Multiple Transmit Antennas $N_u$ mobiles transmit their encoded sequences out of all of their transmit antennas at the same time and the $M_b \times 1$ received signal vector at the BS is given as:

$$R(k,d) = \sum_{u=1}^{N_u} \sum_{m=1}^{M_{m,u}} G_{u,m}(k,d) Z_{u,m}(k,d) + N(k,d) \tag{13}$$

where $G_{u,m}(k,d)$ is the $M_b \times 1$ uplink channel vector on subcarrier k and time d for mobile u's $m^{th}$ transmit antenna and $N(k,d)$ is additive Gaussian noise with correlation matrix given by $\sigma_n^2 I_{M_b}$ ($I_n$ is an n×n identity matrix).

To recover estimates of each mobile's uplink waveforms, $\hat{Z}_{u,m}(k,d)$, the BS utilizes the following MMSE combining weight for transmit antenna m at mobile u:

$$w_{u,m}(k,d) = \left( \sum_{l=1}^{N_u} \sum_{m=1}^{M_{m,l}} \hat{G}_{l,m}(k,d) \hat{G}_{l,m}^H(k,d) + \sigma_n^2 I_{M_b} \right)^{-1} \hat{G}_{u,m}(k,d) \tag{14}$$

where $\hat{G}_{u,m}(k,d)$ is the uplink channel estimate obtained from pilot symbols sent from each mobile.

The estimate of mobile u's $m^{th}$ transmit antenna's uplink waveform is given as:

$$\hat{Z}_{u,m}(k,d) = w_{u,m}^H(k,d) R(k,d) \tag{15}$$

Using this estimate along with the encoding strategy for mobile u (i.e., whether frequency-domain or time-domain channel estimates are sent and whether separable-in-time or orthogonal-in-frequency encoding is used), the BS can obtain estimates of the channels that were measured at each mobile. Note that standard channel estimation procedures can be used in this step to help obtain a gain over noise plus interference from encoding the channels for multiple BS antennas together. Now the BS has downlink channel estimates to use for TxAA operations at time t (for a total feedback latency of t-b OFDM symbols).

Reception and Decoding of the Feedback at a Relay

As described earlier, the unit receiving the feedback signal unit can be a relay/repeater. In this case, the relay operation/processing on the received channel waveform is basically the same as would occur in a BS.

Another aspect of the present invention is the signaling methodology that supports the efficient channel feedback methodology. An example embodiment is the IEEE 802.16e/D5 draft specification, wherein a methodology is in place to allow subscriber stations (SSs) to transmit channel sounding waveforms on the uplink for the purpose of enabling the base station to estimate the uplink channel response between each SS antenna and each BS antenna. This uplink channel sounding methodology of Section 8.4.6.2.7.1 of the IEEE 802.16e/D5 draft specification can be modified to incorporate and support the efficient feedback signaling methodology of the present invention. The idea is to use the same uplink channel sounding methodology of Section 8.4.6.2.7.1 of the IEEE 802.16e/D5 draft specification to enable the BS to estimate the uplink channel response. However, each symbol within the sounding zone (portion of the uplink (UL) frame where the SSs transmit sounding waveforms), each symbol interval in which UL sounding waveforms are sent can be followed by a symbol interval in which the feedback waveform (channel waveform) can be sent by the SSs that transmitted sounding waveforms. The UL sounding waveforms enable the BS to estimate the UL channel, which is then used to estimate the transmitted feedback (channel) waveforms that embody the efficient feedback methodology of the present invention.

The first example of incorporating the efficient feedback methodology of the present invention into a communication system defined by the IEEE 802.16e/D5 draft specification is as follows. The Uplink channel sounding methodology in Section 8.4.6.2.7 of IEEE 802.16e is modified to include instructions for the optional direct transmission of DL channel coefficients (channel estimates) for a plurality of subcarriers in addition to the sounding waveform. The modification extends the UL channel sounding signaling to enable closed-loop transmission in FDD systems and TDD systems in which BS array transceiver calibration is not implemented. The modification consists of an additional field in the UL_Sounding_Command_IE( ), which is a message that the BS may configure and transmit to a SS for the purpose of indicating or instructing whether or not the channel coefficients are to be transmitted along with the sounding waveform in the sounding zone. When this functionality for the direct transmission of channel coefficients is used, the sounding waveform specified by the Sounding Command enables the BS to estimate the UL channel, which the BS then uses to estimate the DL channel coefficients being sent by the SS in the feedback portion of the sounding waveform. These estimated DL channel coefficients can then be used by the BS to perform closed-loop transmission. One example of a message that can be configured and transmitted by the BS used to command or instruct an SS to send the efficient feedback waveform is as follows:

TABLE 1

UL_Sounding_Command_IE( )

| Syntax | Size | Notes |
|---|---|---|
| UL_Sounding_Command_IE( ){ | | |
| Extended UIUC | 4 bits | 0x09 |
| Length | 4 bits | Variable |
| Sounding_Type | 1 bit | 0 = Type A |
| | | 1 = Type B |
| Send Sounding Report Flag | 1 bit | |
| If (Sounding_Type == 0) { | | |
|     Include Feedback Symbols | | 0 = No Feedback Symbols |
| | | 1 = Include Feedback Symbols |
| | | (See Section 8.4.6.2.7.3) |
|     Num_Sounding_symbols | 3 bits | Total number of sounding symbols being allocated in this Sounding Command, from 1 ("000") to $2^3$=8 ("111") |
|     Separability Type | 1 bit | 0: occupy all subcarriers in the assigned bands; |
| | | 1: occupy decimated subcarriers |
|     if (Separability type==0) { | | (using cyclic shift separability) |
|         Max Cyclic Shift Index P | 2 bits | 00: P=4; |
| | | 01: P=8; |
| | | 10: P=16, |
| | | 11: P=32 |
|     } Else { | | (using decimation separability) |
|         Decimation Value D | 3 bits | Sound every $D^{th}$ subcarrier within the sounding allocation. Decimation value D is 2 to the power of (2 plus this value), hence 4, 8, ... up to maximum of 64. |

TABLE 1-continued

UL_Sounding_Command_IE( )

| Syntax | Size | Notes |
|---|---|---|
|         Decimation offset randomization | 1 bit | 0= no randomization of decimation offset<br>1= decimation offset pseudo-randomly determined |
| }<br>For (i=0;i<Num_Sounding_symbols;i++){ | | |
|     Sounding symbol index | 3 bits | Symbol index within the Sounding Zone, from 1 (bits "000") to $2^3$=8 (bits "111") |
|     Number of CIDs | 4 bits | Number of CIDs sharing this sounding allocation |
|     For (j = 0; j<Num. of CIDs; j++) { | | |
|         Shorted basic CID | 12 bits | 12 LS bits of the MSS basic CID value |
|         Starting Frequency Band | 7 bits | Out of 96 bands at most (FFT size dependent) |
|         Number of frequency bands | 7 bits | Contiguous bands used for sounding |
|         Power Assignment Method | 2 bits | 0b00 = equal power;<br>0b01 = reserved;<br>0b10 = Interference dependent. Per subcarrier power limit;<br>0b11 = Interference dependent. Total power limit |
|         Power boost | 1 bit | 0 = no power boost<br>1= power boost |
|         Multi-Antenna Flag | 1 bit | 0=MSS sounds first antenna only<br>1=MSS sounds all antennas |
|         if (Separability type==0) { | | |
|             Cyclic time shift index m | 5 bits | Cyclically shifts the time domain symbol by multiples (from 0 to P −1) of N/P where N=FFT size, and P=Max Cyclic Shift Index. |
|         } Else { | | |
|             Decimation Offset d | 6 bits | Relative starting offset position for the first sounding occupied subcarrier in the sounding allocation |
|         } | | |
|         Periodicity | 2 bits | 00=single command, not periodic, or terminate periodicity<br>01=repeat sounding once per frame until terminated<br>10= repeat instructions once per 2 frames<br>11 = repeat instructions once per 4 frames |
|     }<br>}<br>} else { | | |
|     Permutation | 2 bits | 0b00 = PUSC perm.<br>0b01 = FUSC perm.<br>0b10 = Optional FUSC perm.<br>0b11 = Adjacent subcarrier perm. |
|     IDcell | 6 bits | |
|     Num_Sounding_symbols<br>for (i=0;i<Num_Sounding_symbols;i++){ | 3 bits | |
|         Number of CIDs<br>        For (j=0; j<Number of CIDs; j++) { | 7 bits | |
|             Shortend basic CID | 12 bits | 12 LS bits of the MSS basic CID value |

TABLE 1-continued

UL_Sounding_Command_IE( )

| Syntax | Size | Notes |
|---|---|---|
| Subchannel offset | 7 bits | The lowest index subchannel used for carrying the burst, starting from subchannel 0 |
| Number of subchannels | 3 bits | The number subchannels with subsequent indexes, used to carry the burst. |
| Periodicity | 2 bits | 00=single command, not periodic, or terminate periodicity<br>01=repeat sounding once per frame until terminated<br>10= repeat instructions once per 2 frames<br>11= repeat instructions once per 4 frames |
| Power Assignment Method | 2 bits | 0b00 = equal power;<br>0b01 = reserved;<br>0b10 = Interference dependent. Per subcarrier power limit;<br>0b11 = Interference dependent. Total power limit |
| Power boost | 1 bit | 0 = no power boost<br>1= power boost |
| } | | |
| } | | |
| } | | |
| Padding | Variable | Pad IE to octet boundary. Bits shall be set to 0 |
| } | | |

Note that the instructions in the IE can specify a specific symbol index and a specific separability type or method from a plurality of methods for constructing the channel waveform. If the field "Include Feedback Symbols" is set to 1, then the UL Sounding Command IE( ) enables or instructs the SS (MSS) to perform the direct transmission of DL channel coefficients to the BS along with the UL sounding waveform. This functionality provides downlink channel state information to the BS in both FDD systems and TDD systems in which BS array transceiver calibration is not implemented. With this functionality or instruction enabled, DL channel coefficients are encoded as described below and are transmitted in one or more Feedback Symbols that immediately following each symbol being used to transmit UL sounding waveforms. In this case, the UL sounding waveform is used by the BS to estimate the UL channel so that the feedback symbols transmitted by the SSs can be estimated by the BS. The encoded feedback symbols can then be used to enable closed-loop transmission on the downlink.

There are two cases depending on the value of the separability type field/instruction. First, if separability type is 0 (cyclic shift separability in the sounding waveform), then a single feedback symbol follows each sounding symbol being allocated with the UL_Sounding_command_IE( ). In that feedback symbol, an SS antenna that transmits sounding in the sounding symbol will transmit an encoded feedback waveform that occupies the same sounding bands allocated for the sounding waveform. The encoded feedback waveform for the $u^{th}$ SS (where u is the cyclic shift index in the UL Sounding Command) is defined for two cases: The first case is for where the SS has a single transmit antenna, but multiple receive antennas and is told with the sounding command IE to sound all antennas (multi-antenna flag set to 1). In this case, the single transmit antenna transmits the sounding waveform appropriate for the single transmit antenna on the sounding symbol and transmits the following feedback waveform in the next symbol interval:

$$Z_u(k) = \beta_u \sum_{l=1}^{M_b} \sum_{m=1}^{M_{m,u}} \hat{H}_{u,m,l}(k) s_u(k) \exp\{-j2\pi k(m-1+(l-1)M_{m,u})/\alpha_u\}$$

where $\hat{H}_{u,m,l}(k)$ is the estimated DL channel coefficient (channel estimate) between the $l^{th}$ BS transmit antenna and the $m^{th}$ receive antenna of the $u^{th}$ SS for subcarrier k; $\beta_u$ is a scaling to make the average transmit power of the feedback waveform (averaged across all frequency) of $Z_u(k)$. be one; $s_u(k)$ is the sounding sequence (known sequence) of Section 8.4.6.2.7.1; $M_{m,u}$ is the number of receive antennas on the $u^{th}$ SS, $\alpha_u$ is $M_{m,u}M_b$; and $M_b$ is the number of BS transmit antennas.

The second case for a separability type of 0 is for when the SS has a number of transmit antennas equal to the number of receive antennas. In this case, the encoded feedback waveform to be transmitted by the SS antenna assigned to cyclic shift index of u in the UL Sounding Command is $$Z_u(k) = \beta_u \sum_{l=1}^{M_b} \hat{H}_{u,l}(k) s_u(k) \exp\{-j2\pi k(l-1)/\alpha_u\}$$

where $\hat{H}_{u,l}(k)$ is the estimated DL channel coefficient between the $l^{th}$ BS transmit antenna and the SS antenna assigned to the cyclic shift index of u in the UL Sounding Command for subcarrier k; $\beta_u$ is a scaling to make the average transmit power of the feedback waveform (averaged across all frequency) of $Z_u(k)$ be one; $s_u(k)$ is the sounding sequence (known sequence) of Section 8.4.6.2.7.1; $\alpha_u$ is $M_b$; and $M_b$ is the number of BS transmit antennas.

When separability type is 1 in the UL Sounding Command (decimation separability in the sounding waveform), then every allocated sounding symbol is followed by a number of feedback symbols equal to the number of BS antennas. In this case, an SS antenna that transmits on subcarrier k of the sounding symbol shall transmit the DL channel coefficient for the $i^{th}$ base antenna to that SS antenna for the $k^{th}$ subcarrier on subcarrier k of the $i^{th}$ feedback symbol following the allocated sounding symbol. In equation form, the SS that transmits a sounding signal on subcarrier k of the sounding symbol shall transmit $\hat{H}_l(k)$ on the $l^{th}$ symbol following the sounding symbol, where $\hat{H}_l(k)$ is the DL channel coefficient from the $l^{th}$ BS antenna to that SS antenna.

Note that the UL Sounding command is a message that the BS configures for a target communication unit (SS), and the message indicates, among other things, a particular method to be used for obtaining channel estimates from the target communication unit for a plurality of subcarriers. For example, one particular method is to include feedback symbols with decimation type separability. As another example, a sounding waveform with decimation type separability is another particular method. After the BS transmits the message to the target communication unit, the target communication unit receives the message, constructs a channel waveform in accordance with the particular method, and transmits the channel waveform to the BS to provide channel knowledge to the BS for a plurality of subcarriers. The BS receives a channel waveform from the target communication unit constructed in accordance with the particular method and can then determine channel estimates for a plurality of subcarriers based on the received channel waveform, as described earlier.

Also note that the UL Sounding Command message can be configured for a plurality of target communication units, instructing each of a plurality of target communication units to simultaneously transmit a channel waveform. When the BS receives the plurality of channel waveforms, it can then determine channel estimates for each of the plurality of target communication units as described earlier. The above example of incorporating the efficient feedback methodology of the present invention into a communication system defined by the IEEE 802.16e/D5 draft specification can be modified for the following additional options or combinations thereof:

An indicator can added to the table to specify whether the feedback waveforms transmitted by the multiple SS antennas are to occupy the same feedback symbol interval (and would be separated by the BS with joint symbol estimation/SDMA-type receiver processing) or are to occupy different feedback symbols (where the BS can decode them without any interference from each other). If the feedback waveform transmitted by the SS antennas are to occupy different feedback symbols, then the particular feedback symbol that an SS antenna will occupy would be determined by the value of the cyclic time shift index value for that SS antenna in the sounding command IE.

An indicator can be added to the table to specify whether the channel coefficients are to be transmitted in the feedback symbol(s) with or without the phase shift encoding in the previous equations. If the channel coefficients are to be transmitted in the feedback symbol(s) without the phase shift encoding, then the feedback channel coefficients for each BS and each SS antenna and a given subcarrier are transmitted individually on a combination of subcarriers and feedback symbol intervals. Another indicator can be added to the table to specify that the Mb channel coefficients for a given SS antenna are transmitted on a particular feedback symbol interval with the Mb coefficients for each of the Mb BS antennas for that SS antenna are transmitted on successive Mb subcarriers within that feedback symbol interval. In this case, the indicator of the previous bullet item can indicate whether the feedback symbols for the different SSs occupy the same (with SDMA-style receive processing at the BS) or different feedback symbol intervals.

It is important to note that the separability type (cyclic or decimation) used in a sounding symbol doesn't have to be used in the one or more subsequent feedback symbols. For the efficient feedback strategy of the present invention, the sounding symbol is simply used to enable the BS to estimate the UL channel response so that the feedback waveforms transmitted in subsequent feedback symbol intervals can be decoded. Any combination of encoding methodology for the sounding waveforms with the encoding methodology for the feedback waveforms can be employed.

Figure 8:
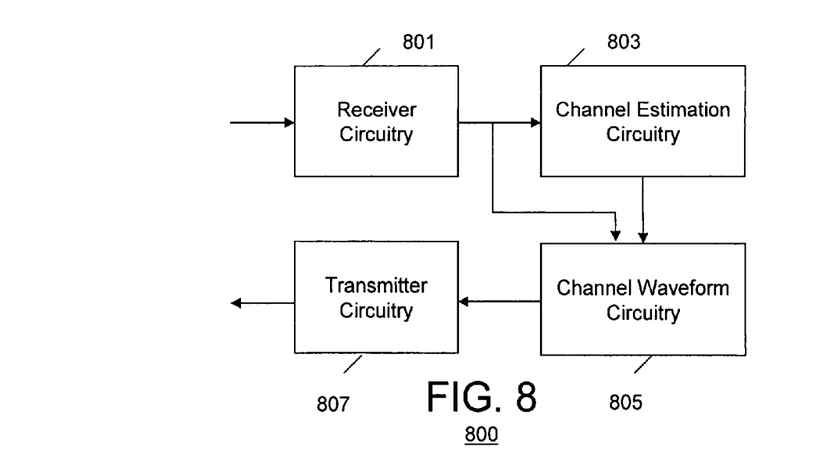
FIG. 8 is an apparatus for communicating channel knowledge.

FIG. 8 shows apparatus 800 for communicating channel knowledge. As shown, apparatus 800 comprises receiver 801, channel estimation circuitry 803, channel waveform circuitry 805, and transmitter 807. Receiver circuitry 801 is provided for receiving a signal from a source communication unit comprising a plurality of subcarriers. Channel estimation circuitry, determines a plurality of channel estimates for a plurality of subcarriers received from the source communication unit and channel waveform circuitry 805 for produces a channel waveform based on the plurality of channel estimates. The channel waveform is then transmitted to the source communication unit in order to provide channel knowledge to the source communication unit.

Figure 9:
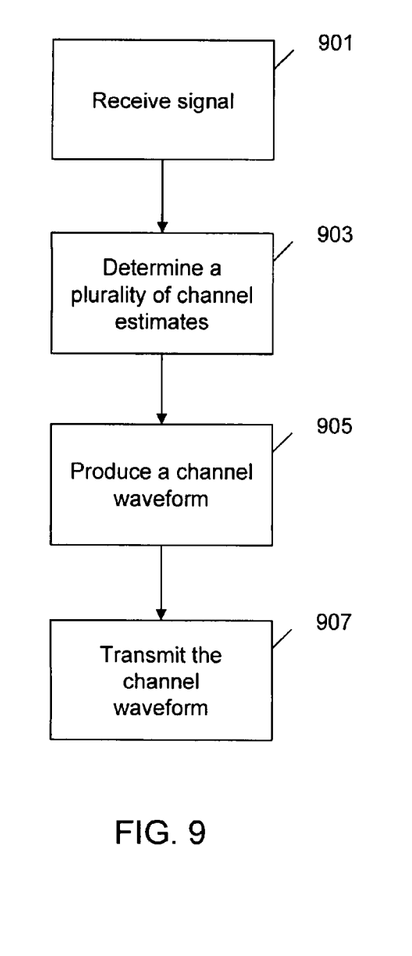
FIG. 9 is a flow chart showing operation of the apparatus of FIG. 8.

FIG. 9 is a flow chart showing operation of apparatus 800. In particular, FIG. 9 shows the steps necessary for a target communication unit to communicate to a source communication unit, knowledge of the channel (e.g., a downlink channel). As described above, the channel comprises a plurality of subcarriers. The logic flow begins at step 901 where a signal is received (e.g., a downlink signal). At step 903 a plurality of channel estimates for the signal is determined. Particularly, at least one channel estimate is determined for each subcarrier of the received signal. At step 905 a channel waveform is produced. As described above, the channel waveform is based on the plurality of channel estimates. Finally, at step 907 the channel waveform is transmitted to the source communication unit in order to convey knowledge of the downlink channel.

Figure 10:
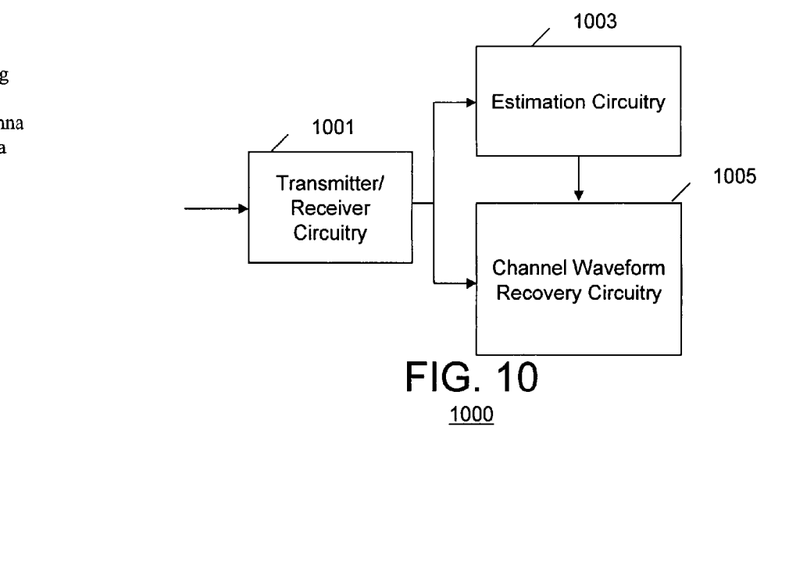
FIG. 10 is an apparatus for recovering channel estimates.

FIG. 10 shows apparatus 1000 for recovering channel estimates (e.g., downlink channel estimates). As shown apparatus 1000 comprises transmitter/receiver 1001, channel estimation circuitry 1003, and channel waveform recovery circuitry 1005. Transmitter/receiver circuitry 1001 is utilized for receiving a signal comprising a channel waveform and is additionally used for transmitting a message specifying one from a plurality of possible methods to be used for constructing the channel waveform. As discussed above, the channel waveform comprises a plurality of channel estimates, wherein the plurality of channel estimates comprise at least one channel estimate for each of a plurality of subcarriers. Estimation circuitry 1003 is provided for estimating a receive channel (e.g., an uplink channel) for the received signal. Finally, channel waveform recovery circuitry 1005 is provided for recovering estimates of the plurality of channel estimates from the uplink signal based on the received signal and the estimated receive channel.

Figure 11:
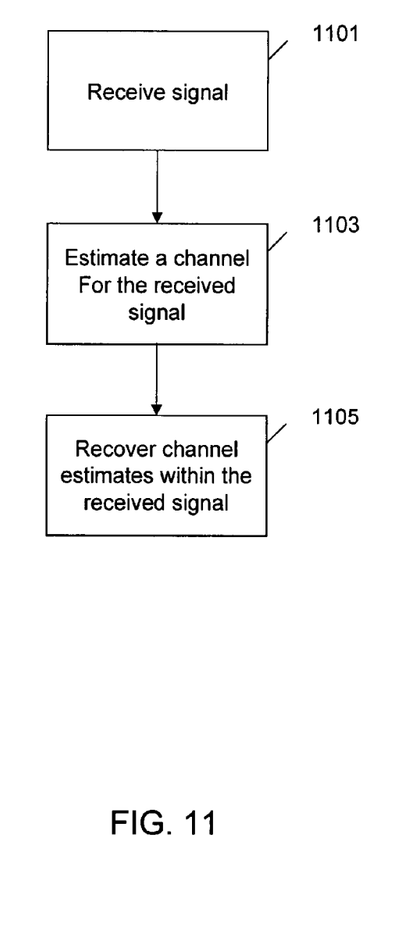
FIG. 11 is a flow chart showing operation of the apparatus of FIG. 10.

FIG. 11 is a flow chart showing operation of apparatus 1000. The logic flow begins at step 1101 where an uplink signal (e.g., an uplink signal) is received. As described above, the uplink signal comprises a channel waveform, the channel waveform has a plurality of channel estimates (e.g., downlink channel estimates), wherein the plurality of channel estimates comprise at least one channel estimate for each of a plurality of subcarriers. At step 1103 a channel estimate is made by estimation circuitry 1003 for the uplink channel. Particularly, in order to recover information from the uplink signal, the channel needs to be appropriately estimated. Once the channel is appropriately estimated, information can be recovered from the uplink signal. Thus, at step 1105 circuitry 1005 recovers the downlink channel estimates within the uplink signal by recovering the channel waveform embedded within the uplink signal and estimates (e.g., reverses the channel waveform encoding process as needed) the channel estimates from the channel waveform. As one of ordinary skill in the art will recognize, the channel estimates can be used to assist a source communication unit to tailor a transmission characteristic of a subsequent transmission to a target communication unit. Examples include but are not limited to determining and applying transmit weights for transmit beamforming or multiple input/multiple output (MIMO) transmission, performing frequency-selective scheduling, band selection, modulation and coding rate selection, etc.

It should be noted that the above discussion provides a method for efficiently providing channel knowledge to a transmitter for use in closed-loop transmission. The mobile encodes multiple broadband channels for transmission in a single or a few OFDM symbols. Multiple mobiles transmit their feedback at the same time and a base station uses its antenna array to separate the feedback from the multiple users. It should be noted that the equations used above are to provide examples of various embodiments. One of ordinary skill in the art will recognize that other equations may be substituted without departing from the spirit and scope of the invention. Additionally, those skilled in the art will recognize that a wide variety of modifications, alterations, and combinations can be made with respect to the above described embodiments without departing from the spirit and scope of the invention, and that such modifications, alterations, and combinations are to be viewed as being within the ambit of the inventive concept. It is intended that such modifications, alterations, and combinations come within the scope of the following claims.

We claim:

1. A method for a target communication unit to communicate to a source communication unit, knowledge of a channel comprising a plurality of subcarriers, the method comprising the steps of:

determining a plurality of channel estimates for a plurality of subcarriers received from the source communication unit;

producing a channel waveform based on the plurality of channel estimates; and communicating knowledge of the channel by transmitting the channel waveform to the source communication unit;

wherein the channel waveform based on at least one of, $$Z_u(k) = \beta_u \sum_{l=1}^{M_b} \sum_{m=1}^{M_{m,u}} \hat{H}_{u,m,l}(k) s_u(k) \exp\{-j2\pi k(m-1+(l-1)M_{m,u})/\alpha_u\};$$

$$Z_u(k) = \beta_u \sum_{l=1}^{M_b} \hat{H}_{u,l}(k) s_u(k) \exp\{-j2\pi k(l-1)/\alpha_u\};$$

$$Z_u(k) = \beta_u \sum_{l=1}^{M_b} \sum_{m=1}^{M_{m,u}} \hat{H}_{u,m,l}(k) q_u(k) \delta((k+1-(l-1)M_{m,u}-m)_{M_{m,u}M_b});$$

and $$Z_{u,m}(k) = \beta_u \sum_{l=1}^{M_b} \hat{H}_{u,m,l}(k) q_{u,m}(k) \delta((k+1-l)_{M_b});$$

where $\hat{H}_{u,m,l}(k)$ is a channel estimate between the source communication unit transmit antenna of index l and a receive antenna of index m at the target communication unit for a subcarrier of index k; $\hat{H}_{u,l}(k)$ is a channel estimate between a source communication unit transmit antenna of index l and a receive antenna at the target communication for a subcarrier of index k; $\delta(n)$ is one if n equals zero and is zero otherwise; $\beta_u$ is a scale factor; $q_{u,m}(k)$, $q_{u,m}(k)$, and $s_u(k)$ are known sequences; $M_{m,u}$ is a number of receive antennas at the target communication unit; $\alpha_u$ is a shift factor; and $M_b$ is a number transmit antennas at the source communication unit.

2. The method of claim 1 wherein the channel waveform comprises a combination of the plurality of channel estimates.

3. The method of claim 1 further comprising the step of transmitting a channel sounding waveform to the source communication unit along with the channel waveform.

4. The method of claim 1 wherein the step of determining a plurality of channel estimates comprises the step of determining a plurality of channel estimates for each of the plurality of subcarriers based on a plurality of transmissions received from the source communication unit.

5. The method of claim 1 wherein the step of determining a plurality of channel estimates for the plurality of subcarriers comprises determining channel estimates for a first plurality of subcarriers corresponding to a first transmission of the source communication unit and determining channel estimates for a second plurality of subcarriers corresponding to a second transmission of the source communication unit.

6. The method of claim 1 wherein the plurality of subcarriers are transmitted by the source communication unit from a plurality of antennas.

7. The method of claim 1 wherein the channel waveform comprises substantially un-quantized channel estimates.

8. The method of claim 1 wherein the channel estimates are determined from received pilot symbols.

9. The method of claim 1 wherein the channel waveform based on the plurality of channel estimates comprises channel estimates modulated by a known sequence.

10. The method of claim 1 wherein the step of producing a channel waveform comprises the step of processing the channel waveform so that the channel waveform fits within a dynamic range of a transmitter of the target communication unit.

11. The method of claim 1 wherein the step of producing the channel waveform comprises the step of processing the channel estimates so that the channel waveform fits within a dynamic range of a transmitter of the target communication unit.

12. The method of claim 1 wherein the step of producing a channel waveform based on the plurality of channel estimates comprises producing a channel waveform based on reciprocals of the plurality of channel estimates.

13. The method of claim 1 wherein the step of producing the channel waveform comprises the step of producing the channel waveform from at least one of:
    mapping the channel estimates to a predetermined set of subcarriers;
    multiplying the channel estimates by a predetermined sequence;
    interleaving the channel estimates;
    interleaving a combination of the plurality of channel estimates; and
    encoding the channel estimates with a phase shift sequence.

14. The method of claim 1 further comprising the steps of:
    receiving a message instructing the target communication unit to transmit at least one of:
    a plurality of symbols having a specific symbol index;
    a plurality of symbols on a starting frequency band and a number of frequency bands to utilize; and
    a plurality of symbols having a specific separability type.

15. The method of claim 1 wherein the channel waveform comprises a combination of orthogonal channel estimates.

16. The method of claim 1 wherein the step of determining the plurality of channel estimates for the plurality of subcarriers comprises the step of determining a plurality of time-domain channel responses for the plurality of subcarriers.

17. The method of claim 1 wherein the step of transmitting the channel waveform comprises the steps of transmitting the channel waveform using a different modulation method than is used for other data transmissions from the target communication unit.

18. A method for communicating channel estimates, comprising the steps of:
    receiving a message, the message indicating at least a particular method to be used for providing channel estimates from a target communication unit for a plurality of subcarriers;
    constructing a channel waveform in accordance with the particular method to provide channel estimates for a plurality of subcarriers; and
    transmitting the channel waveform to aide a source communication unit in determining channel estimates for the plurality of subcarriers.

19. The method of claim 18 wherein the channel waveform comprises at least one of:
    a sounding waveform; and
    a plurality of channel estimates for a plurality of subcarriers.

20. The method of claim 18 wherein the message comprises at least one of:
    an instruction to transmit a plurality of symbols having a specific separability type;
    an instruction to transmit channel estimate feedback symbols;
    an instruction to transmit a plurality of symbols having a specific symbol index; and
    an instruction to transmit a plurality of symbols on a starting frequency band and a number of frequency bands to utilize.

21. A method for obtaining channel estimates at a source communication unit, the method comprising the steps of:
    configuring a message for a target communication unit, the message indicating at least a particular method to be used for obtaining channel estimates from the target communication unit for a plurality of subcarriers;
    transmitting the message to the target communication unit;
    receiving a channel waveform from the target communication unit, wherein the channel waveform is constructed in accordance with the particular method; and
    determining channel estimates for the plurality of subcarriers based on the received channel waveform.

22. The method of claim 21 wherein the step of receiving a channel waveform comprises the step of simultaneously receiving a channel waveform from each of a plurality of target communication units, and wherein the step of determining channel estimates for the plurality of subcarriers comprises the step of determining channel estimates for each of the plurality of target communication units.

23. The method of claim 21 wherein the channel waveform comprises at least one of:
    a sounding waveform; and
    a plurality of channel estimates for a plurality of subcarriers.

24. An apparatus for communicating channel knowledge, the apparatus comprising:
    receiver circuitry, for receiving a signal from a source communication unit comprising a plurality of subcarriers;
    channel estimation circuitry, for determining a plurality of channel estimates for a plurality of subcarriers received from the source communication unit;
    channel waveform circuitry, for producing a channel waveform based on the plurality of channel estimate; and
    transmission circuitry, for transmitting the channel waveform to the source communication unit in order to provide channel knowledge to the source communication unit
    wherein the channel waveform based on at least one of, $$Z_u(k) = \beta_u \sum_{l=1}^{M_b} \sum_{m=1}^{M_{m,u}} \hat{H}_{u,m,l}(k) s_u(k) \exp\{-j2\pi k(m-1+(l-1)M_{m,u})/\alpha_u\};$$

$$Z_u(k) = \beta_u \sum_{l=1}^{M_b} \hat{H}_{u,l}(k) s_u(k) \exp\{-j2\pi k(l-1)/\alpha_u\};$$

$$Z_u(k) = \beta_u \sum_{l=1}^{M_b} \sum_{m=1}^{M_{m,u}} \hat{H}_{u,m,l}(k) q_u(k) \delta\big((k+1-(l-1)M_{m,u}-m)_{M_{m,u}M_b}\big);$$

-continued and $$Z_{u,m}(k) = \beta_u \sum_{l=1}^{M_b} \hat{H}_{u,m,l}(k) q_{u,m}(k) \delta\big((k+1-l)_{M_b}\big);$$

where $\hat{H}_{u,m,l}(k)$ is a channel estimate between the source communication unit transmit antenna of index l and a receive antenna of index m at the target communication unit for a subcarrier of index k; $\hat{H}_{u,l}(k)$ is a channel estimate between a source communication unit transmit antenna of index l and a receive antenna at the target communication for a subcarrier of index k; $\delta(n)$ is one if n equals zero and is zero otherwise; $\beta_u$ is a scale factor; $q_{u,m}(K)$, $q_{u,m}(K)$, and $s_u(K)$ are known sequences; $M_{m,u}$ is a number of receive antennas at the target communication unit; $\alpha_u$ is a shift factor; and $M_b$ is a number transmit antennas at the source communication unit.

25. The apparatus of claim 24 wherein the step plurality of channel estimates comprises channel estimates for each of the plurality of subcarriers based on a plurality of transmissions received from the source communication unit.

26. The apparatus of claim 24 wherein the channel waveform fits within a dynamic range of a transmitter of the target communication unit.

27. The apparatus of claim 24 wherein the channel waveform is produced from at least one of:
  mapping the channel estimates to a predetermined set of subcarriers;
  multiplying the channel estimates by a predetermined sequence;
  interleaving the channel estimates;
  interleaving a combination of the plurality of channel estimates; and
  encoding the channel estimates with a phase shift sequence.

28. A method for a target communication unit to communicate to a source communication unit, knowledge of a channel comprising a plurality of subcarriers, the method comprising the steps of:
  determining a plurality of channel estimates for a plurality of subcarriers received from the source communication unit;
  producing a channel waveform based on the plurality of channel estimates; and
  communicating knowledge of the channel by transmitting the channel waveform to the source communication unit;
  receiving a message instructing the target communication unit to transmit at least one of:
  a plurality of symbols having a specific symbol index;
  a plurality of symbols on a starting frequency band and a number of frequency bands to utilize; and
  a plurality of symbols having a specific separability type.

29. The method of claim 28 wherein the channel waveform comprises a combination of the plurality of channel estimates.

30. The method of claim 28 wherein the channel waveform based on at least one of, $$Z_u(k) = \beta_u \sum_{l=1}^{M_b} \sum_{m=1}^{M_{m,u}} \hat{H}_{u,m,l}(k) s_u(k) \exp\{-j2\pi k(m-1+(l-1)M_{m,u})/\alpha_u\};$$

$$Z_u(k) = \beta_u \sum_{l=1}^{M_b} \hat{H}_{u,l}(k) s_u(k) \exp\{-j2\pi k(l-1)/\alpha_u\};$$

$$Z_u(k) = \beta_u \sum_{l=1}^{M_b} \sum_{m=1}^{M_{m,u}} \hat{H}_{u,m,l}(k) q_u(k) \delta\big((k+1-(l-1)M_{m,u}-m)_{M_{m,u}M_b}\big);$$

and $$Z_{u,m}(k) = \beta_u \sum_{l=1}^{M_b} \hat{H}_{u,m,l}(k) q_{u,m}(k) \delta\big((k+1-l)_{M_b}\big);$$

where $\hat{H}_{u,m,l}(k)$ is a channel estimate between the source communication unit transmit antenna of index l and a receive antenna of index m at the target communication unit for a subcarrier of index k; $\hat{H}_{u,l}(k)$ is a channel estimate between a source communication unit transmit antenna of index l and a receive antenna at the target communication for a subcarrier of index k; $\delta(n)$ is one if n equals zero and is zero otherwise; $\beta_u$ is a scale factor; $q_{u,m}(k)$, $q_{u,m}(k)$, and $s_u(k)$ are known sequences; $M_{m,u}$ is a number of receive antennas at the target communication unit; $\alpha_u$ is a shift factor; and $M_b$ is a number transmit antennas at the source communication unit.

31. The method of claim 28 further comprising the step of transmitting a channel sounding waveform to the source communication unit along with the channel waveform.

32. The method of claim 28 wherein the step of determining a plurality of channel estimates comprises the step of determining a plurality of channel estimates for each of the plurality of subcarriers based on a plurality of transmissions received from the source communication unit.

33. The method of claim 28 wherein the step of determining a plurality of channel estimates for the plurality of subcarriers comprises determining channel estimates for a first plurality of subcarriers corresponding to a first transmission of the source communication unit and determining channel estimates for a second plurality of subcarriers corresponding to a second transmission of the source communication unit.

34. The method of claim 28 wherein the plurality of subcarriers are transmitted by the source communication unit from a plurality of antennas.

35. The method of claim 28 wherein the channel waveform comprises substantially un-quantized channel estimates.

* * * * *